United States Patent [19]

Butt

[11] Patent Number: 4,627,367

[45] Date of Patent: Dec. 9, 1986

[54] HOT GAS GENERATION

[75] Inventor: Andrew R. Butt, Quedgeley, England

[73] Assignee: Coal Industry (Patents) Limited, England

[21] Appl. No.: 671,470

[22] Filed: Nov. 14, 1984

[30] Foreign Application Priority Data

Dec. 6, 1983 [GB] United Kingdom ............... 8332506

[51] Int. Cl.$^4$ ............................................. F23D 1/00
[52] U.S. Cl. .................................... 110/347; 48/210; 110/229
[58] Field of Search ................ 48/77, 101, 210; 110/347, 229, 346; 122/4 D

[56] References Cited

U.S. PATENT DOCUMENTS

| 4,253,409 | 3/1981 | Wormser | 110/347 |
| 4,325,327 | 4/1982 | Kantesaria et al. | 122/4 D |
| 4,344,371 | 8/1982 | Zoschak | 110/229 |
| 4,344,373 | 8/1982 | Ishii et al. | 110/347 |
| 4,419,966 | 12/1983 | Jenkins et al. | 122/4 D |
| 4,457,289 | 7/1984 | Korenberg | 122/4 D |

FOREIGN PATENT DOCUMENTS

| 1434314 | 5/1976 | United Kingdom . |
| 1439457 | 6/1976 | United Kingdom . |
| 1453400 | 10/1976 | United Kingdom . |
| 1466813 | 3/1977 | United Kingdom . |
| 1485319 | 9/1977 | United Kingdom . |

Primary Examiner—Edward G. Favors
Attorney, Agent, or Firm—Stevens, Davis, Miller & Mosher

[57] ABSTRACT

In a hot gas generating apparatus coal is fed to a first gasifying fluidized bed wherein it is partially gasified to generate a combustible gas and char. The char is circulated to a second combustion fluidized bed for burning in the presence of excess air. The combustible gas is mixed with the oxygen rich gases from the second bed and burnt to give a hot gas product.

10 Claims, 9 Drawing Figures

HOT GAS GENERATION

This invention concerns improvements in or relating to hot gas generation.

In particular, the present invention has reference to the generation of hot gas by the use of a fluidised bed process. It is already known from our earlier British Pat. Nos. 1 494 006 and 1 502 926 to employ fluidised bed processes for this purpose. In British Pat. No. 1 494 006 there is disclosed a method of gasifying coal in which a zoned fluidised bed is created whereby combustion of coal in one zone provides the necessary heat for the endothermic gasification step which is carried out in another contiguous zone of the bed, the gaseous streams from the respective zones being maintained separate.

In British Pat. No. 1 502 926, a substantially clean hot gas generation process is described in which a fuel is burnt in a first fluidised bed arranged adjacent to a second bed through which a gas to be heated is passed, bed material being circulated between the first and second beds. In this process also, the respective gas streams are kept separate from one another to avoid contamination.

Hot gas generated in these earlier processes has usually attained a temperature level of about 950° C. It has been found, however, that there is a requirement in industry for gases having temperatures in the region of 1200° to 1250° C. Currently oil or gas is employed for producing hot gas in drying processes needing temperatures of this higher order. Increasing emphasis is being placed upon the expansion of coal utilization in industry generally and to this end efforts have been made to enhance the design and performance of coal fired fluidised bed units in an endeavour to meet current and projected requirements.

It is an object, therefore, of the present invention to provide an improved method of and apparatus for generating a hot gas.

According to a first aspect of this invention a method of generating a hot gas includes the steps of establishing a first fluidised bed of particulate material adjacent a second fluidised bed of particulate material, feeding coal to the first fluidised bed, partially gasifying the coal in said first fluidised bed to generate a combustible gas and char, circulating material between the first and second beds, burning the char in the second fluidised bed to generate oxygen rich gases, mixing the combustible and oxygen rich gases downstream of the first and second fluidised beds, and burning the combustible gas in the oxygen rich gases to generate a hot gas product.

Advantageously, the char is burnt within the second fluidised bed to the presence of excess air.

Material circulated between the first and second fluidised beds may be fluidised during the circulation thereof.

The circulation of material as aforesaid may be achieved by fluidising the first and second beds at different velocities. Conventionally, the fluidising velocity in the second bed is higher than that in the first bed. Variation in the degree of circulation may be effected by varying the respective fluidising velocities.

Circulation of material between the first and second beds may take place at one or more locations along a mutual boundary between the beds. The calorific value of the combustible gas is inversely proportional to the number of locations at which circulation is effected, the rate of circulation being proportional to that number. Preferably, such circulation of material occurs adjacent to the bases of the first and second beds across the mutual boundary.

The plan areas of the first and second beds may be equal. Alternatively the plan area of the second bed may be greater than that of the first bed. For example, the ratio of the plan area of the second fluidised bed to that of the first fluidised bed may be 2:1 or 3:1.

The method may also include the step of introducing coal as required directly into the second fluidised bed in order to maintain the temperature thereof at the requisite value.

Coal is conveniently fed continuously into the first fluidised bed.

According to a second aspect of the invention apparatus for carrying out the method of generating a hot gas, the apparatus including a reactor body, a first gasification region within the body adapted to contain a first fluidised bed, a second combustion region within the body adapted to contain a second fluidised bed, fluidising means associated with the first and second regions, an apertured partition wall dividing the first and second regions and at least part of the respective freeboards thereabove, a combustion zone in the body downstream of the communicating with the freeboards of the first and second regions, means for feeding coal to the first region, and a hot gas product outlet in the body.

The fluidising means may conveniently be in the form of sparge pipes provided with standpipes having perforations at or near their free ends. A common manifold for the fluidising means in the first and second regions may be provided together with separate controls for each region.

The partition wall may be apertured by means of the provision of one or more ports therein. The or each port may conveniently be formed at or near the base of the wall adjacent the bases of the first and second regions. In an alternative, the or each port may be sited part way up the wall. The or each port may be provided with auxiliary fluidising means which may be in the form of one or more sparge pipes having standpipes and of similar configuration to the fluidising means of the first and second regions.

The partition wall is preferably vertical in which case the combustion zone is defined above the termination of the wall, the hot gas product outlet leading from this zone either vertically or horizontally therefrom. In an alternative configuration, the vertical wall is provided with a horizontal extension defining separate paths from the freeboard of the first and second regions into the combustion zone. A suitable connection between the path from the freeboard above the second region to the combustion zone via the other path may be provided. The connection may be in the form of tubing providing a short circuit between the path from the freeboard of the second region to the lower part of the combustion zone.

By way of example only, the method of and apparatus for generating a hot gas according to the present invention are described below with reference to the accompanying drawings in which.

Figure 1:
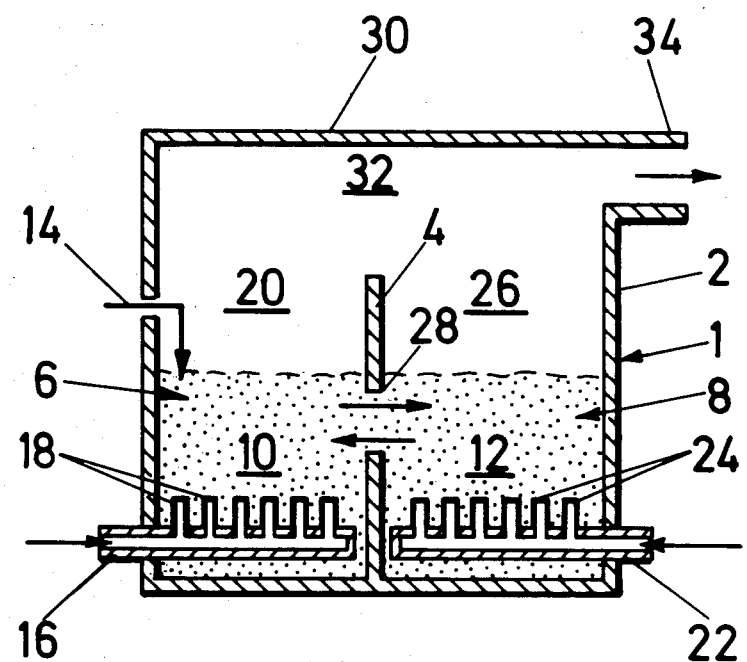
FIG. 1 is a diagrammatic cross sectional view through the apparatus.

Referring to the drawings, there is shown in FIG. 1 an apparatus 1 for generating a hot gas, the apparatus including a reactor body 2 divided internally by a vertical partition 4 into a first, gasification region 6 and a second, combustion region 8 adapted respectively to contain a first fluidised bed 10 and a second fluidised bed 12 each of which is composed on an inert particulate material, for example silica sand. The first region 8 is provided with a coal inlet at 14 and has a sparge pipe array 16 incorporating perforated standpipes 18, a freeboard 20 being in use defined above the fluidised bed 10. The second region 19 has a sparge pipe array 22 with standpipes 24 and has a freeboard 26 in use defined above the bed 12. The partition 4 is apertured by the provision of at least one port 28 whereby regions 8,10 are inter communicating, and terminates at a distance from the top 30 of the body 2. A mixing and combustion region 32 is defined above the top of the partition 4 and is common to both freeboards 20,26. A hot gas outlet 34 is located at the top of the side wall of the body 2.

In operation, the apparatus is first started up by passing preheated air, for example at a temperature of 700° C., at approximately the same velocity into both beds 10,12 to fluidise and heat same. Once the temperature of the bed 10 has reached about 600° C., coal feed to the beds 10,12 is commeneced, the temperature of the bed increasing as a consequence to 900° C. The heat source to the air is discontinued at this stage, and ambient air is fed to both beds. The beds 10,12 may then be left to stabilise for 15 minutes, but this is not a requirement.

Coal is then fed to the bed 10 continuously and gradually the bed becomes rich in carbon. Soon thereafter, the respective fluidising velocities are adjusted such that the velocity through bed 12 is set at a greater value than that in bed 10 thereby to promote circulation of material between the beds. Coal feed to bed 12 is dependent upon the temperature level within the bed. This level has to be sufficient for the purposes of burning the char circulated from bed 10 to bed 12, the combustion occurring with an excess of air. Once the appropriate level has been reached, the feed is discontinued. Coal feed is restarted partially if the level of temperature should fall.

The coal is gasified within bed 10 and a low c.v. gas is produced, passing upwardly into the freeboard 20. The resulting char is circulated into the bed 12 wherein it is burnt to give combustion gases richer in oxygen by virtue of the superstoichiometric conditions obtaining in bed 12. These combustion gases flow into the freeboard 26, mix with the low c.v. gas within region 32 and the gas from bed 10 is burnt therein to give a hot product gas which exhausts through outlet 34. Experiments have shown that the hot product gas can have a temperature as high as 1350° C. and 1400° C., whereas the temperatures of the gases within the freeboard may only be of the order of 920° to 950° C. The invention thus provides a method of generating a hot gas having a higher temperature than gas emerging from a conventional fluidised bed combustor or gasifier.

Figure 2:
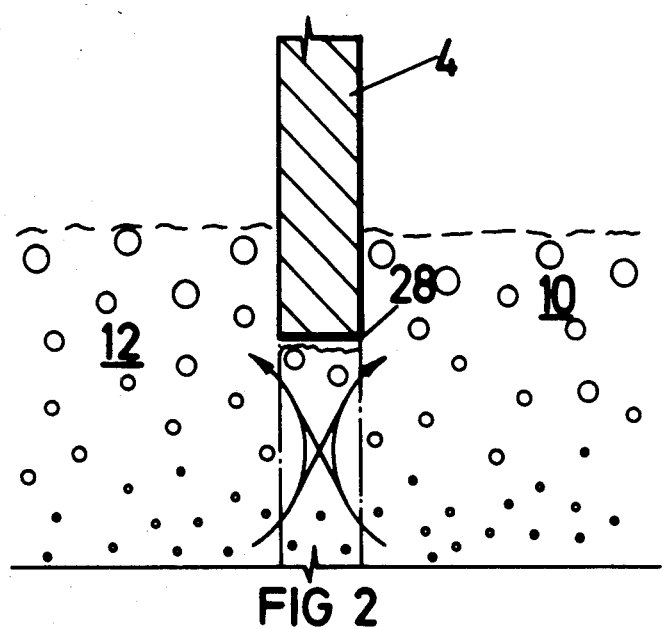
FIG. 2 is a diagrammatic fragmentary view of a detail of the apparatus in FIG. 1.
Figure 3:
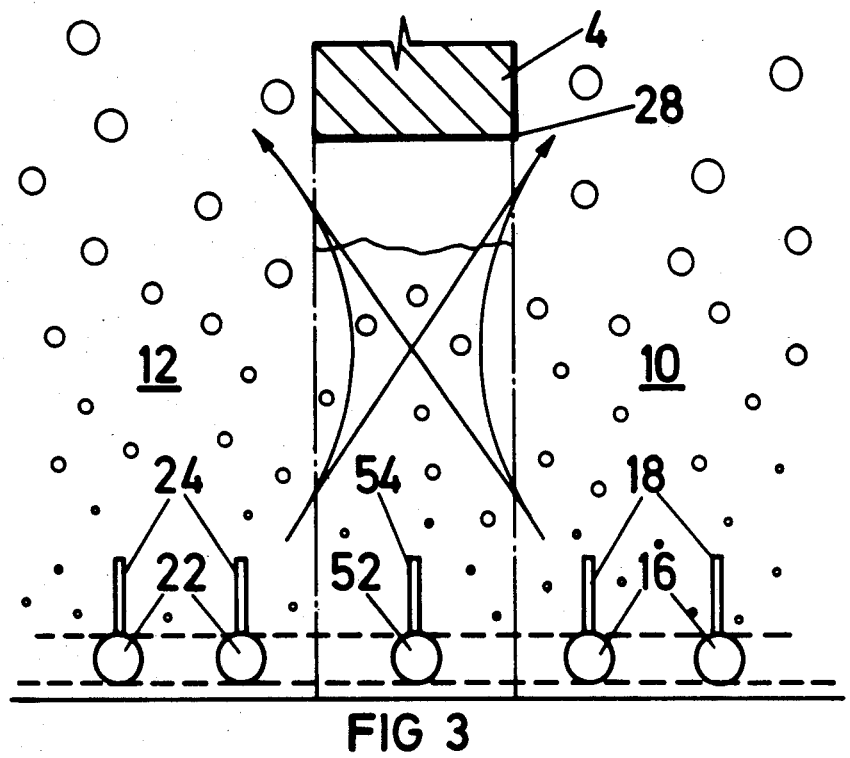
FIG. 3 is a diagrammatic fragmentary view of an alternative configuration of the detail shown in FIG. 2.

Referring now more particularly to FIG. 2, there is shown a fragmentary view of the port 28 in partition 4 which is of a relatively narrow thickness. In FIG. 3, an alternative configuration of port 28 is shown formed in the partition 4 which is of relatively greater thickness than that shown in FIG. 2. In this configuration the port 28 is provided in its base region with a fluidising means in the form of a sparge pipe 52 having standpipes 54 (only one of which is shown). With port 28 a separate fluidised bed 56 is likely to be formed in practice and in order to ensure the maintenance of fluidising conditions in the port 28, the separate fluidising means are provided and will also assist in the circulatory movement of material between beds 10 and 12.

Figure 4:
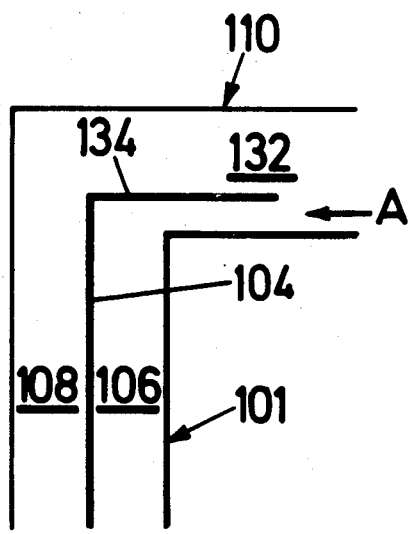
FIG. 4 is a diagrammatic fragmentary view of a further detail of the apparatus in FIG. 1 illustrated on a different scale.
Figure 5:
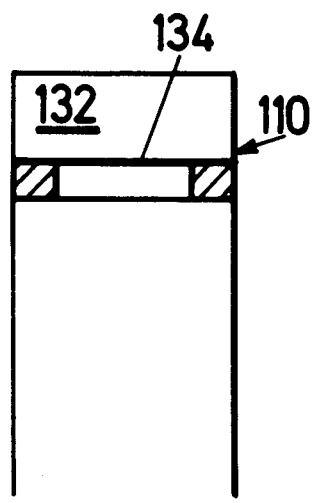
FIG. 5 is a diagrammatic end view on arrow 'A' in FIG. 4.

Referring now to FIGS. 4 and 5, a gasification region 106 and a combustion region 108 of an apparatus 101 are shown diagrammatically with a vertical partition 104. At the upper end of apparatus 101, there is provided a horizontal section 110 defining a mixing and combustion region 132. A horizontal extension 134 of partition 104 protrudes into the section 110 to keep the gases from the respective regions 108,106 separate until they merge in the combustion zone 132 for burning.

Figure 6:
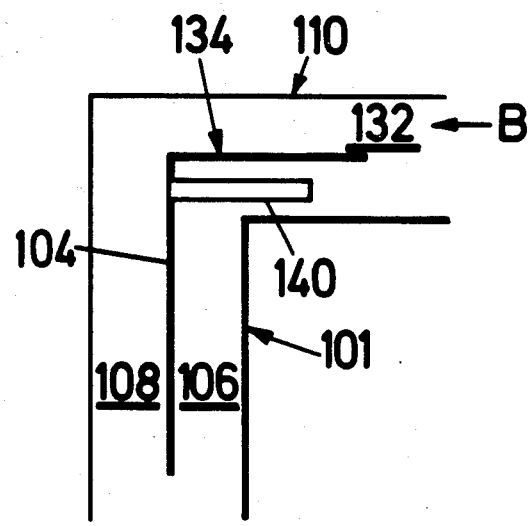
FIG. 6 is a diagrammatic fragmentary view of an alternative configuration of the detail shown in FIG. 4.
Figure 7:
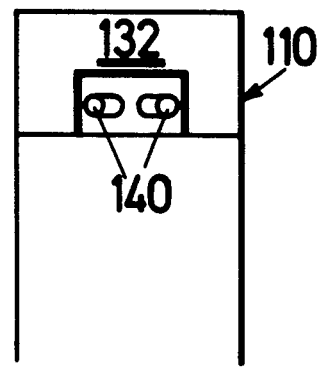
FIG. 7 is a diagrammatic end view on arrow 'B' in FIG. 6.

In an alternative configuration shown in FIGS. 6 and 7, tubes 140, preferably of a heat resistant material such for example as silica carbide, penetrate the partition 104 and extend into the horizontal section 110 beneath the extension 134, thus providing a partial short-circuit for gases from region 108. The reason for providing tubes 140 is that as the gases from the respective regions 106,108 mix in region 132 the low c.v. gas at the lower margin of extension 134 may have insufficient oxygen to burn. Some of the combustion gases, rich in oxygen are short circuited to this lower margin thereby ensuring adequate combustion conditions.

Figure 8:
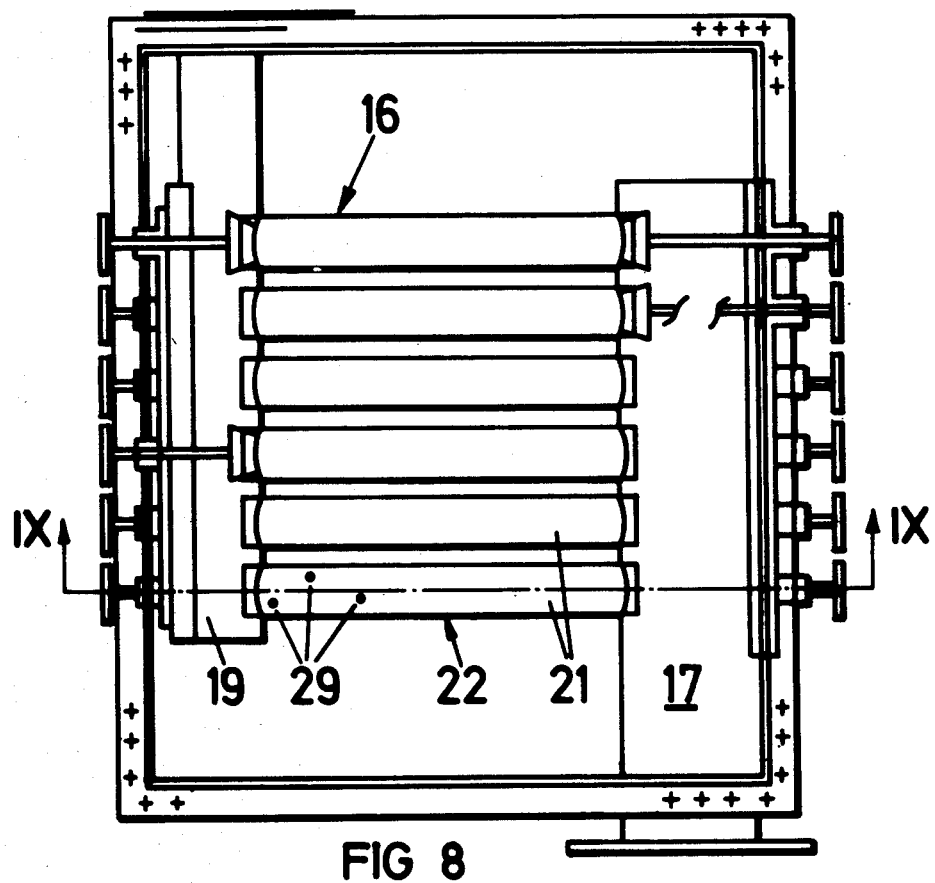
FIG. 8 is a plan view of the apparatus with parts removed for clarity.
Figure 9:
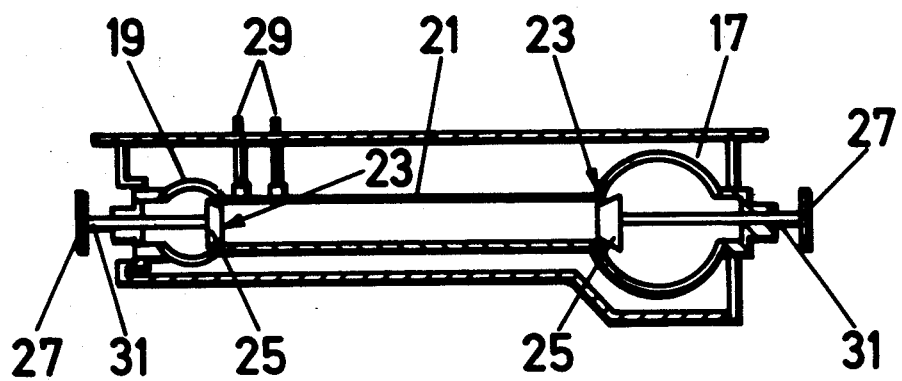
FIG. 9 is a section on the line IX—IX in FIG. 8.

FIGS. 8 and 9 show parts of the apparatus 1 in greater detail than in FIG. 1. In particular there is illustrated the fluidising means 16,22, the partition 4 being removed for the sake of clarity. The fluidising means 16,22 comprise two mainfolds, 17, 19 for primary and secondary air, sparge pipes 21 extending laterally therebetween. Each sparge pipe 21 has at each end thereof a valve 23 comprising a taper seat plunger 25 carried by a spindle 31 extending across the respective manifolds 17, 19 and terminating externally thereof in a hand wheel 27. Standpipes 29 extend from the upper margins of the sparge pipes 21 and are perforated at or near their upper ends for the egress of air. The provision of the valves 23 allows a fine control of air issuing into the gasifying and combustion regions of the apparatus.

The present invention thus affords the means for generating a hot gas using coal as a feedstock which is partially gasified, the resulting char being burnt. The combustion of the gas derived from gasification is burnt in the combustion gases rich in oxygen and as a result a product gas of high temperature is generated and can be used to meet demand in process industries.

I claim:

1. A method of generating a hot gas including the steps of establishing a first fluidised bed of particulate material and a second fluidised bed of particulate material adjacent the first fluidised bed, feeding coal to the first fluidised bed, partially gasifying the coal in the said first fluidised bed to generate a combustible gas and char, circulating material in a bi-directional manner between the first and second beds across a mutual boundary, fluidising the material at the boundary during circulation thereof, burning the char in the second fluidised bed to generate oxygen rich gases, mixing the combustible and oxygen rich gases downstream of the first and second beds, and burning the combustible gas in the oxygen rich gases to generate a hot gas product.

2. A method according to claim 1 in which the char is burnt within the second fluidised bed in the presence of excess air.

3. A method according to claim 1 in which material circulated between the first and second beds is fluidised during the circulation thereof.

4. A method according to claim 1 in which the circulation of material between the first and second beds is achieved by fluidising the first and second beds at different fluidising velocities.

5. A method according to claim 4 in which the fluidising velocity in the second bed is greater than that in the first bed.

6. A method according to claim 4 in which the rate of circulation of material is varied by varying the fluidising velocities in the first and second beds.

7. A method according to claim 1 in which the circulation of material occurs adjacent the bases of the first and second beds across the mutual boundary.

8. A method according to claim 1 in which the plan areas of the first and second beds are equal.

9. A method according to claim 1 in which coal is introduced into the second fluidised bed in order to maintain the temperature of the bed at the requisite level for the combustion of the char.

10. A method according to claim 1 in which coal is fed continuously into the first fluidised bed.

* * * * *